United States Patent [19]

Williams et al.

[11] Patent Number: 5,350,731

[45] Date of Patent: Sep. 27, 1994

[54] THERMALLY TRANSFERABLE FLUORINE-CONTAINING AZO DYES

[75] Inventors: Linda K. Williams; Prakob Kitipichai, both of St. Paul; Cecil V. Francis, Woodbury; Ramaiah Muthyala, Mendota Heights, all of Minn.

[73] Assignee: Minnesota Mining and Manufacturing Company, St. Paul, Minn.

[21] Appl. No.: 163,375

[22] Filed: Dec. 7, 1993

[51] Int. Cl.$^5$ .................... B41M 5/035; B41M 5/38
[52] U.S. Cl. .................... 503/227; 428/195; 428/913; 428/914
[58] Field of Search .................... 8/471; 428/195, 913, 428/914; 503/227

[56] References Cited

U.S. PATENT DOCUMENTS 5,234,887 8/1993 Gregory et al. .................... 503/227

Primary Examiner—B. Hamilton Hess
Attorney, Agent, or Firm—Gary L. Griswold; Walter N. Kirn; Mark A. Litman

[57] ABSTRACT

The present invention provides fluorine-containing arylazoanaline dyes that are useful in thermal transfer systems. Specifically, the present invention provides thermal transfer donor sheets containing dyes of the following formula:

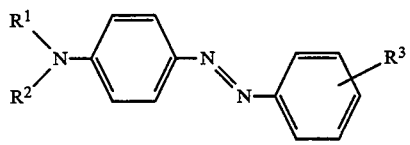

wherein: $R^1$ is a $(C_{1-20})$alkyl or hydroxy$(C_{1-20})$alkyl group; $R^2$ is a hydroxy$(C_{1-20})$alkyl or $(C_{1-20})$alkylene—OC(O)NH—$(C_{1-20})$alkylene—OC(O)—$R^4$ wherein $R^4$ is a $(C_{1-20})$alkenyl group or a polymerized alkenyl group; and $R^3$ is F or $CF_3$. Useful dyes of this formulation are stable under ambient conditions for at least about 6 months.

17 Claims, 3 Drawing Sheets

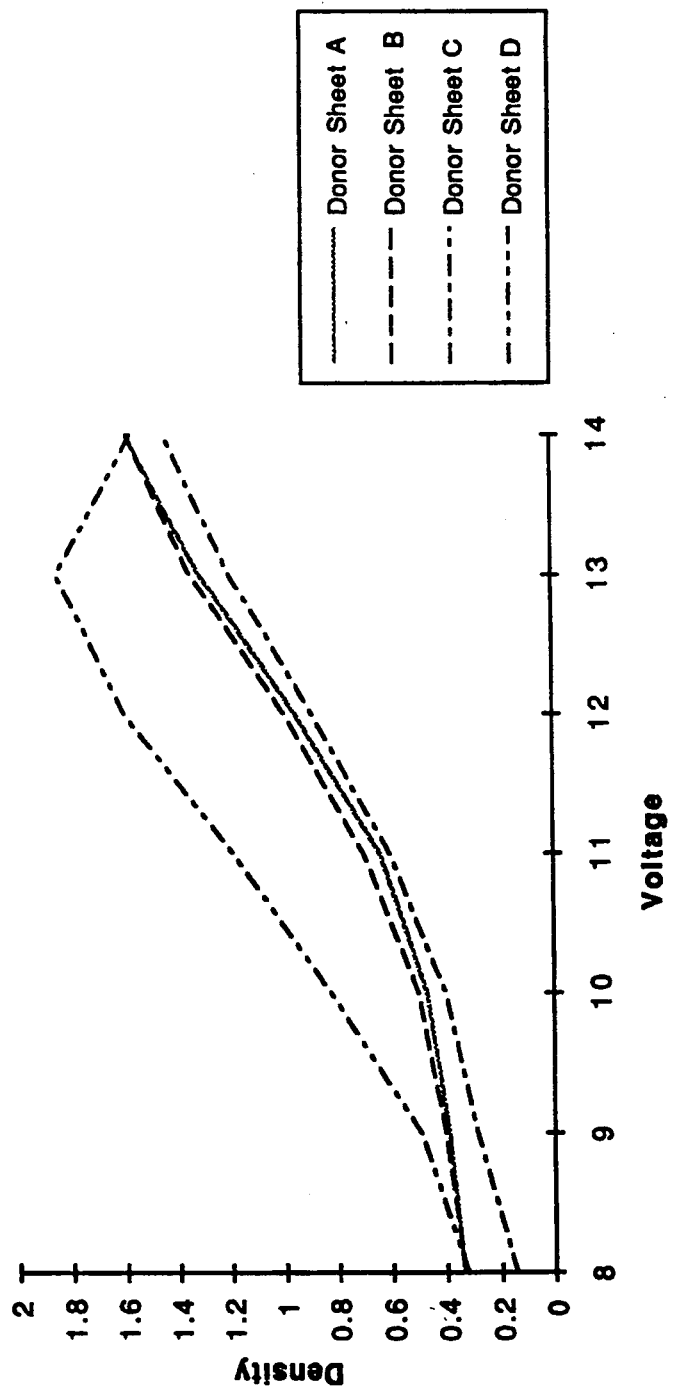

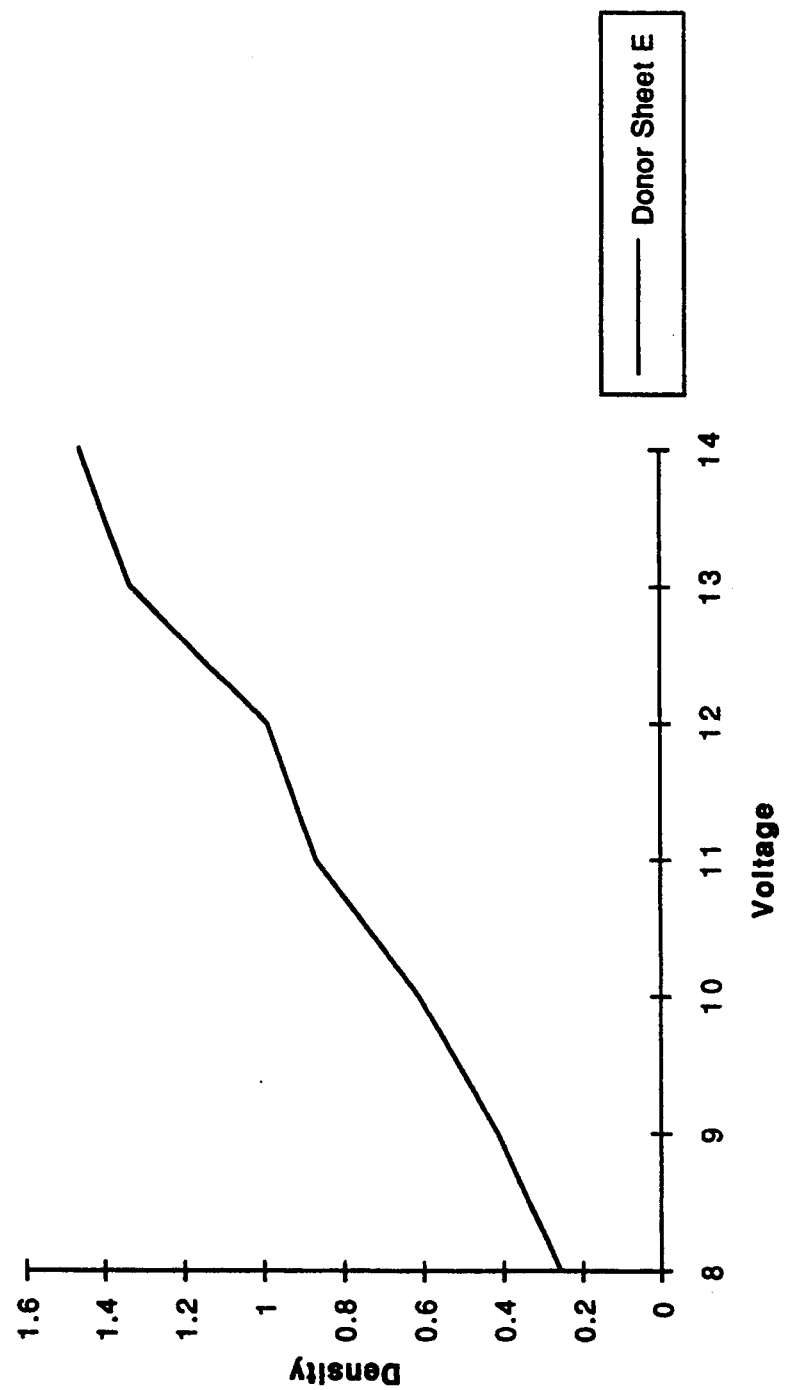
FIGURE #2

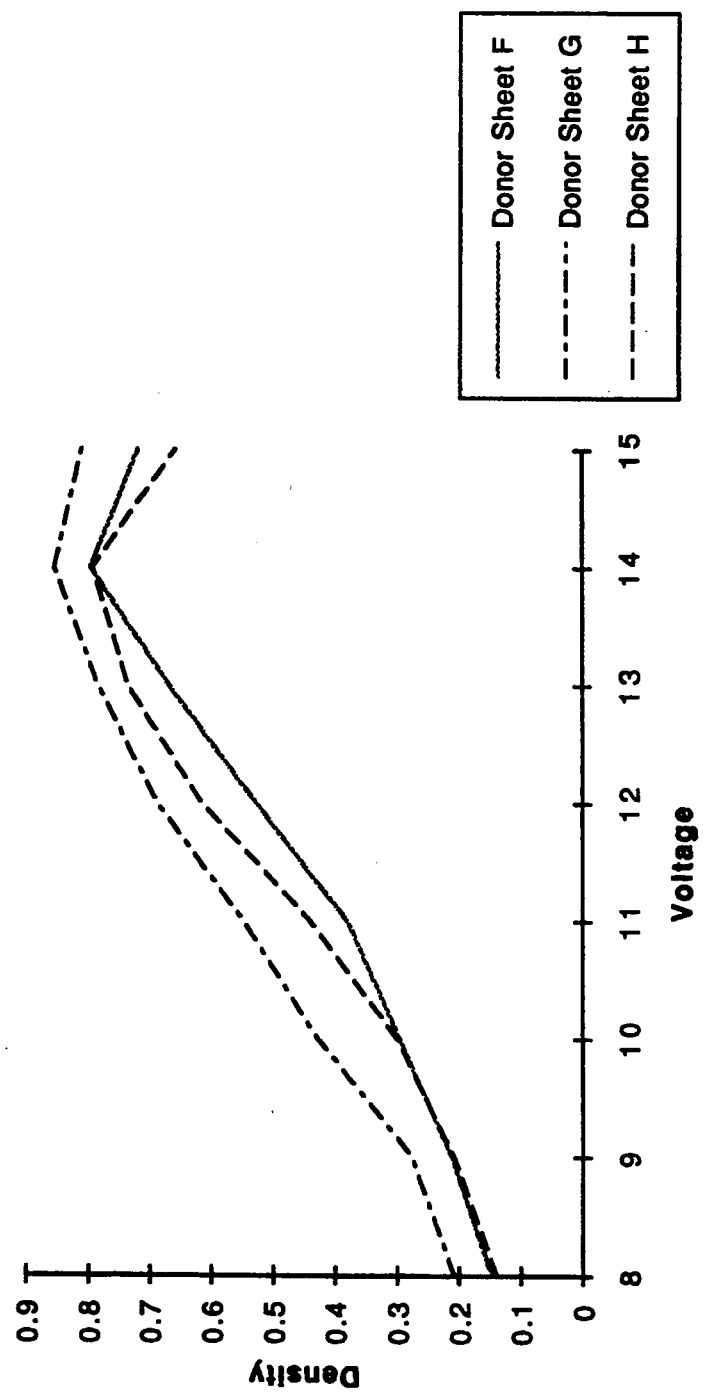

THERMALLY TRANSFERABLE FLUORINE-CONTAINING AZO DYES

FIELD OF THE INVENTION

The present invention relates to thermal transfer printing, and more particularly to dyes used in a thermal dye transfer printing construction. Specifically, the present invention relates to a series of fluorine-containing, i.e. fluorine- or trifluoromethyl-containing, arylazoaniline dyes capable of providing yellow-orange colorfast images and excellent light stability in a thermal transfer printing process.

BACKGROUND OF THE INVENTION

In thermal transfer printing, an image is formed on a receptor sheet by selectively transferring a dye from a dye donor sheet to a receptor sheet, typically having coated thereon an image receiving layer. The term "thermal transfer" is used herein in a broad sense and includes any printing process by which dye (alone or in association with carrier materials such as solvents, binders. etc.) is transferred from one layer to another layer or sheet upon an application of thermal energy. Typically, material to be transferred from the dye donor sheet is directed by a thermal printhead, which consists of small electrically heated elements (print heads). These elements transfer image-forming material from the dye donor sheet to areas of the dye receptor sheet in an image-wise manner.

Thermal transfer printing processes are well known in the art and include such systems as thermal dye transfer, sublimation dye transfer, and thermal mass transfer. Other systems included within the broad terminology used herein include direct transfer, strippable transfer, peel apart, and the like. In each of these systems, the dye is typically contained within a polymeric or resinous binder thereby forming a dye donor layer on the donor sheet. Typically, the dye is present in the binder in an amount of at least about 2%, depending upon the degree of its transfer and its covering power in the transferred state. The receptor sheet typically has a polymeric or resinous material coated thereon to form an image receiving layer for receipt of the dye. In a mass transfer system the dye is transferred with the binder. Thus, in such systems, the receptor sheet may not need an additional image receiving layer.

Thermal transfer dyes typically should meet several performance criteria for practical applications. They should be able to transfer from the donor to the receptor upon application of thermal energy. For systems other than mass transfer systems, in which the entire quantity of dye transfers, the dyes should ideally demonstrate grey levels, i.e., grey scales. That is, the dyes should be able to transfer in controlled amounts depending upon the amount of thermal energy applied to the donor. Also, thermal transfer dyes should be stable once incorporated into the donor sheet. That is, they should generally remain in solid solution without crystallizing or migrating to the surface. Furthermore, thermal transfer dyes should preferably be stable once transferred to the receptor sheet. That is, they should not significantly retransfer, e.g., resublime or retro-sublime, from the dye image on the receptor sheet.

Arylazoaniline dyes (often represented as A-N=N-E wherein A is a phenyl group and E is an aniline group) are commonly used in various printing systems. Examples of such dyes are disclosed in U.S. Pat. Nos. 4,059,402 (issued Nov. 22, 1977), 4,212,642 (issued Jul. 15, 1980), 4,614,521 (issued Sep. 30, 1986), 4,619,893 (issued Oct. 28, 1986), 4,776,886 (issued Oct. 11, 1988), and 4,975,410 (issued Dec. 4, 1990), as well as in W. Harms, *Organofluorine Chemicals and their Industrial Applications*, Chapter 9, p. 188, R. E. Banks, ed., (1979), G. Wolfram, *Organofluorine Chemicals and their Industrial Applications*, Chapter 10, p. 208, R. E. Banks, ed., (1979), and V. V. Karpov et al., *Dyes and Pigments*, 5, 285 (1984). Many of these dyes, however, are unsatisfactory for use in thermal transfer systems because they are generally unstable in either the donor layer or the receiving layer or both. That is, many of these dyes have a tendency to bloom or crystalize out of the donor layer and/or resublime from the receiving layer over time.

Arylazoaniline dyes useful for thermal transfer printing are disclosed in U.S. Pat. Nos. 5,122,499 (issued Jun. 16, 1992) and 5,234,887 (issued Aug. 10, 1993). In the '499 patent, it is generally mentioned that semi-polar substituents are used to provide a decreased degree of retro-sublimation; however, it is not clear what substituents are within this definition. Furthermore, emphasis is placed on substitutions on the amine nitrogen and the phenyl ring of the aniline component of the dye to provide acceptable properties. In the '887 patent the phenyl group is substituted by at least one electron-withdrawing group, e.g., $CF_3$, but is free from groups carrying acidic hydrogen atoms capable of forming intermolecular hydrogen bonds. Typically, fluorine-containing dyes tend to bloom or crystallize out of the donor layer.

SUMMARY OF THE INVENTION

The present invention provides fluorine-containing arylazoaniline dyes that are useful in thermal transfer systems. As used herein, "fluorine-containing" refers to compounds containing either fluorine substituents or trifluoromethyl substituents. Specifically, the present invention provides a thermal transfer donor sheet comprising a flexible substrate having coated thereon a dye donor layer containing a dye of the following formula (Formula I):

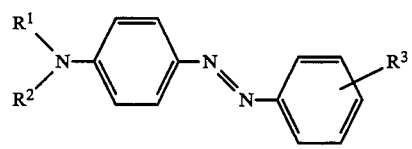

wherein: $R^1$ is a $(C_{1-20})$alkyl or hydroxy$(C_{1-20})$alkyl group; $R^2$ is a hydroxy$(C_{1-20})$alkyl or $(C_{1-20})$alkylene—OC(O)NH—$(C_{1-20})$alkylene—OC(O)—$R^4$ wherein $R^4$ is a $(C_{2-20})$alkenyl group or a polymerized alkenyl group; and $R^3$ is F or $CF_3$. Useful dyes are those that are stable under ambient conditions for at least about 6 months. Preferably, the dye donor layer also contains a binder, although the binder can be part of the dye itself.

Preferably, $R^1$ is a $(C_{2-8})$alkyl or hydroxy$(C_{2-8})$alkyl group and $R^2$ is a hydroxy$(C_{2-8})$alkyl or $(C_{2-8})$alkylene—OC(O)NH—$(C_{2-8})$alkylene—OC(O)—$R^4$ wherein $R^4$ is a $(C_{2-8})$alkenyl group or a polymerized alkenyl group. More preferably, $R^1$ is a $(C_{2-4})$alkyl or hydroxy$(C_{2-4})$alkyl group and $R^2$ is a hydroxy$(C_{2-4})$alkyl or $(C_{2-4})$alkylene —OC(O)NH—$(C_{2-4})$alkylene—OC(O)—$R^4$ wherein $R^4$ is —$(CH_3)C=CH_2$ or a polymerized —$(CH_3)C=CH_2$ group.

Most preferably, $R^1$ is —$CH_2CH_3$ or —$CH_2CH_2OH$ and $R^2$ is —$CH_2CH_2OC(O)NHCH_2CH_2OC(O)$—$R^4$ wherein $R^4$ is —$(CH_3)C=CH_2$ or

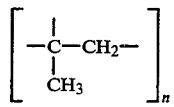

wherein n=2-100, preferably 3-50, and more preferably 3-10. For the compounds in which there is a polymerized alkenyl group, the molecular weight of the polymer is about 500-50,000, preferably about 1300-25,000, more preferably about 1300-12,000, and most preferably about 1300-5000.

As used herein, the term "alkyl" refers to a monovalent saturated hydrocarbon moiety that may be considered to be formed by loss of a hydrogen atom from an alkane. e.g., —$CH_2CH_3$. The term "hydroxyalkyl" refers to an alkyl moiety further substituted with an —OH group, e.g., —$CH_2CH_2OH$. The term "alkylene" refers to a divalent moiety that may be considered to be formed by loss of two hydrogen atoms from an alkane, e.g., —$CH_2CH_2$—. The term "alkenyl" refers to an unsaturated aliphatic hydrocarbon containing one or more double bonds, e.g., —$(CH)_3C=CH_2$.

BRIEF DESCRIPTION OF THE DRAWINGS

FIG. 1 is a density level plot achieved by representative dye donor sheets as the voltage is varied.

FIG. 2 is a density level plot achieved by a representative dye donor sheet as the voltage is varied.

FIG. 3 is a density level plot achieved by representative dye donor sheets as the voltage is varied.

DETAILED DESCRIPTION OF INVENTION

The present invention provides fluorine-containing arylazoaniline dyes that are useful in thermal transfer systems. Specifically, the present invention provides dyes of the following formula (Formula I):

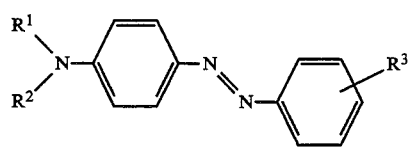

wherein: $R^1$ is a $(C_{1-20})$alkyl or hydroxy$(C_{1-20})$alkyl group; $R^2$ is a hydroxy$(C_{1-20})$alkyl or $(C_{1-20})$alkylene—OC(O)NH—$(C_{1-20})$alkylene—OC(O)—$R^4$ wherein $R^4$ is a $(C_{2-20})$alkenyl group or a polymerized alkenyl group; $R^3$ is F or $CF_3$; and the dye is stable under ambient conditions for at least about 6 months, preferably at least about 1 year.

Preferably, $R^1$ is a $(C_{2-8})$alkyl or hydroxy$(C_{2-8})$alkyl group and $R^2$ is a hydroxy$(C_{2-8})$alkyl or $(C_{2-8})$alkylene—OC(O)NH—$(C_{2-8})$alkylene—OC(O)—$R^4$ wherein $R^4$ is a $(C_{2-8})$alkenyl group or a polymerized alkenyl group. More preferably, $R^1$ is a $(C_{2-4})$alkyl or hydroxy$(C_{2-4})$alkyl group and $R^2$ is a hydroxy$(C_{2-4})$alkyl or $(C_{2-4})$alkylene—OC(O)NH—$(C_{2-4})$alkylene—OC(O)—$R^4$ wherein $R^4$ is —$(CH_3)C=CH_2$ or a polymerized —$(CH_3)C=CH_2$ group.

Most preferably, $R^1$ is —$CH_2CH_3$ or —$CH_2CH_2OH$ and $R^2$ is —$CH_2CH_2OC(O)NHCH_2CH_2OC(O)$—$R^4$ wherein $R^4$ is —$(CH_3)C=CH_2$ or

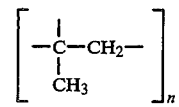

wherein n=2-100, preferably 3-50, and more preferably 3-10. For the compounds in which there is a polymerized alkenyl group, the molecular weight of the polymer is about 500-50,000, preferably about 1300-25,000, more preferably about 1300-12,000, and most preferably about 1300-5000.

Two particularly preferred dyes for use in the donor sheet of the present invention are of the formulae:

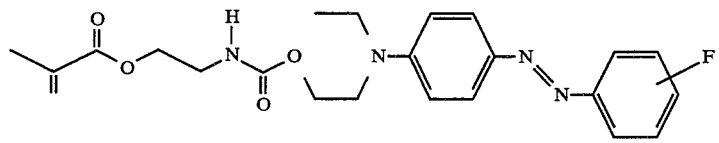

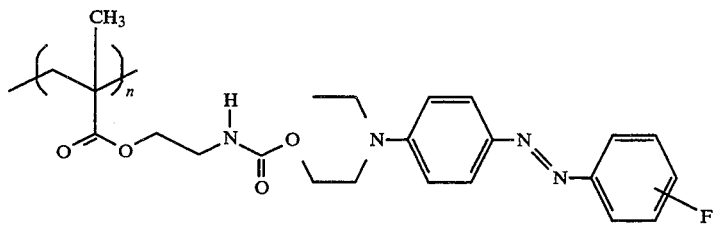

In the general Formula I, the fluorine-containing substituent, i.e., $R^3$, can be in the ortho, meta, or para position of the phenyl ring. Certain preferred dyes of the present invention include a mixture of the ortho, recta, and para isomers of the compounds for added stability. For example, one particularly preferred donor sheet uses a mixture of the ortho, recta, and para isomers of the compound of the above formula wherein both $R^1$ and $R^2$ are —$CH_2CH_2OH$ and $R^3$ is $CF_3$. Thus, although the individual compounds of the dye mixture may not be stable as defined herein, the mixture is stable.

The term "dye" as used in the practice of the present invention refers to a compound which absorbs at least some radiation in the visible region of the electromagnetic spectrum with a molar extinction coefficient in a suitable solvent rising at least to 500, and therefore exhibits a color. Typically, the fluorine-containing arylazoaniline dyes of the present invention have absorption maxima in the region 410–550 nm. Thus, they are useful for the printing of yellow-orange shades. It is to be understood that the dye of the present invention may be a mixture of compounds of Formula I. Furthermore, it is to be understood that dyes that are not within the scope of Formula I can be mixed in with the compounds of the present invention to provide other colors.

The dyes of the present invention have good thermal properties such that the depth of shade in the image on the receptor sheet is related to the amount of heat applied. That is, they give rise to grey levels and a good gradation of color density. They are sufficiently mobile to migrate from the donor sheet to the receptor sheet at temperatures generally employed in thermal transfer processes.

The dyes of the present invention are at least partially soluble in those solvents that are widely used in the printing industry, such as ethanol, isopropanol, butanol, toluene, methyl ethyl ketone, cyclohexanone, and the like. Although good solubility facilitates the application of the dye to the substrate, this is not a requirement of the dyes of the present invention. That is, the thermal transfer dyes of the present invention can be present in the donor layer in the form of a solid (which is often referred to as a pigment).

Generally, thermal transfer donor sheets containing fluorine-containing arylazoaniline dyes are generally not very stable during storage. For example, such dyes tend to separate from the binder over time. Surprisingly, however, the fluorine-containing dyes of the present invention are stable within the dye donor layer on the donor sheet under ambient conditions, i.e., a temperature of about 20°–30° C. at 1 atm pressure, for at least about 6 months. Preferably, the dyes of the present invention are stable on the donor sheet for at least about 1 year. That is, they typically do not substantially bloom or crystallize from the binder on the donor sheet, they do not tend to transfer under pressure alone, and they do not significantly transfer from the front to the back of the transfer sheet when the transfer sheet is rolled up for storage.

Although not a requirement for use in the present invention, the dyes are also preferably generally stable on the receptor sheet under ambient conditions tier at least about 6 months, and more preferably for at least about 1 year. That is, they typically do not bleed, i.e., transfer from the dye receiving layer onto another material with which it is in contact. If any particular dye has a tendency to bloom or crystallize from either the donor sheet or the receptor sheet, it can generally be mixed with another dye of the invention, preferably a more stable dye, to provide a more stable mixture.

Generally, the dyes of the present invention can be prepared by coupling diazotized fluorine-containing anilines with electron donating arylamines. Procedures to carry out such coupling reactions are known to those of skill in the art of organic synthetic chemistry.

Conventional thermal transfer donor sheets, i.e., dye donor sheets, include a dye donor layer coated on a substrate. Typically, this layer includes a dye in combination with a binder, although a binder may not always be present. That is, in certain situations the binder can be a part of the dye, as in polymeric dyes, for example. The thermal dye donor sheet of the present invention can be prepared by: introducing a dye or combination of dyes and various other components for making the dye donor layer, such as a polymeric or resinous binder, curing agent, preservative, etc., into a suitable solvent, e.g., tetrahydrofuran or methyl ethyl ketone, or solvent mixture: dissolving or dispersing the components to form a coating composition; coating the composition onto a substrate; and drying the resultant dye donor layer, preferably at elevated temperatures. Suitable coating techniques include knife coating, roll coating, curtain coating, spin coating, extrusion die coating, gravure coating, etc. The thickness of the dye donor layer is typically about 0.0007–0.0025 mm.

The polymeric or resinous binders used in the dye donor layers of the present invention typically bind the dye to the substrate. They also allow transfer of the dye to the receptor sheet upon the application of thermal energy. Although the binder is typically a separate material combined with the dye to make a composition for coating on the donor sheet, it is understood that the binder can also be a part of the dye. For example, a dye can include a chromophore attached to a polymeric organic group wherein the polymeric organic group performs the functions of a binder.

The binder in a thermal mass transfer donor system is typically a thermoplastic resin with Tg (glass transition temperature) below 100° C. or a low melting wax. These materials have a low enough melting or softening point that they are capable of transferring with the colorant to the receptor sheet. Examples of such binders include, but are not limited to, copolymers of vinyl chloride and vinyl acetate, butadiene and styrene copolymers, hydrocarbon waxes, epoxy resins, and chlorinated waxes. Examples of such thermal mass transfer donor sheets are disclosed in U.S. Pat. Nos. 4,839,224 (issued Jun. 13, 1989) and 4,847,237 (issued Jul. 11, 1989). The binder in a thermal dye transfer donor sheet is typically a thermoplastic resin with Tg of about 25°–180° C., and preferably about 50°–160° C. Useful binders are those that do not transfer themselves, but allow the colorant to diffuse, sublime, melt, or vaporize, etc. out of the colorant layer thereby leaving the binder on the donor sheet. Examples of such binders include, but are not limited to, vinyl chloride/vinyl acetate copolymers, polyesters, polycarbonates, polyacrylates, cellulose acetates, polyvinyl chloride (PVC), and chlorinated PVC. Examples of such thermal dye transfer donor sheets are disclosed in U.S. Pat. No. 4,847,238 (issued Jul. 11, 1989). The preferred binder for use with the dyes of the present invention is polyvinyl chloride.

The dye donor layer can also include additives to help solubilize and stabilize the dye. These include polyurethanes, UV stabilizers, heat stabilizers, plasticizers, surfactants, silicones, low Tg polymers (Tg no greater than about 80° C.), elastomers, etc. The additives can be added in concentrations of about 0.1–20 wt-%, based on the total dye concentration.

Suitable substrates for the backings of the dye donor sheets of the present invention include any flexible material to which a donor layer can be adhered and which can withstand the temperatures involved in thermal transfer processes. The substrates can be smooth or rough, transparent or opaque, porous or nonporous, reflective, and continuous or sheetlike. It can be formed from a film-forming material, such as paper, polymeric film, and the like. Examples of materials for such substrates include, but are not limited to, polyesters, polysulfones, polystyrenes, polycarbonates, polyimides, polyamides, cellulose esters, polyvinyl chlorides, polyethylenes, and polypropylenes. The substrate for a donor sheet generally has a thickness of about 2–100 μm, but are typically about 3–8 μm thick to be able to feed through currently available printers and for effective heat conduction.

The dye donor sheets of the present invention can also include a layer of an adhesion promoter between the backing substrate and the dye donor layer, i.e., an adhesive or primer layer. Suitable adhesion promoters include, for example, VITEL PE200 (available from Goodyear). Alternatively or additionally, a dye-barrier layer can be used between the backing substrate and the dye donor layer to improve the dye transfer densities by preventing wrong-way transfer of dye towards the backing. Suitable dye-barrier layers are described in EP 227091 (published Jul. 1, 1987) and EP 228065 (published Jul. 8, 1987).

The donor sheets of the present invention can also include an antistick layer, i.e., a layer of a heat-resistant material that prevents the donor sheet from sticking to the thermal print head. The antistick layer is coated on the backside of the substrate, i.e., the side of the substrate opposite the side on which the colorant is coated. This backside coating of an antistick material can include a silicone, polyurethane, higher fatty acid, fluorocarbon resin, etc. Examples of materials used in antistick layers are disclosed in U.S. Pat. No. 5,141,915 (issued Aug. 25, 1992).

The donor sheets of the present invention can also include an antistatic layer coated over the dye donor layer. An antistatic layer causes the thermal transfer sheets to remain static resistant during both imaging and processing. This helps prevent dust-induced defects in the imaged sheets.

It is to be understood that the thermal transfer systems of the present invention can also include a lubricating layer coated over the dye donor layer to improve separability of the donor sheet from the receptor sheet after image transfer. Typically, however, such a coating is applied over the image receiving layer on the receptor sheet. Lubricating layers permeable to colorants under normal conditions are well known. They are generally characterized by low surface energy and include silicone and fluorinated polymers. Examples include fluorinated polymers such as polytetrafluoroethylene, and vinylidene fluoride/vinylidene chloride copolymers, and the like, as well as dialkylsiloxane-based polymers.

The thermal dye donor sheets of the invention are used in combination with a dye receptor sheet, i.e., a substrate on which is coated an image receiving layer into which the dye can be transferred to form an image. The image receiving layer, i.e., dye receiving layer, on the receptor sheet is typically in direct contact with the donor dye layer during thermal transfer imaging. The receptor sheet is designed to effectively receive an image from a donor sheet and to hold the image and yield a desired print with high optical image density, brightness, and stability. The image-receiving layer generally consists of a polymeric resin that has a strong affinity toward dyes. The polymeric resin can be thermoplastic, cross-linked, heat-cured, radiation-cured, etc. Preferably, it is a thermoplastic resin. Several classes of thermoplastic resins are known for use as an image receiver, including, but not limited to, polyesters, polyamides, polycarbonates, polyurethanes, polyvinylchlorides, polycaprolactones, poly(styrene-co-acrylonitriles), and mixtures thereof. Desired properties for effective image receptivity include inherent viscosity, molecular weight, glass transition temperature, compatibility, etc. Examples of thermal dye transfer receptor sheets are described in U.S. Pat. No. 4,853,365 (issued Aug. 1, 1989). In thermal dye transfer systems, the donor colorant layer and the image-receiving layer preferably contain the same binder resin for advantageous diffusion. Examples of thermal mass transfer receptor sheets are described in U.S. Pat. No. 4,853,365 (issued Aug. 1, 1989).

A dye image is transferred from the dye donor sheet to the receptor sheet by the application of thermal energy. In a typical application, the dye donor layer on the thermal transfer donor sheet is placed in contact, i.e., a facing relationship, with the image receiving layer on the thermal transfer receptor sheet and selectively heated according to a pattern of information signals, i.e., in an imagewise distributed manner. In this way, dye (and in a mass transfer process, the binder as well) from the selectively heated regions of the dye donor sheet is transferred to the receptor sheet. A pattern is formed thereon in a shape and density according to the intensity of heat applied to the donor sheet. The heating source can be an electrical resistive element, a laser such as an infrared laser diode, an infrared flash, a heated pen, or the like. The quality of the resulting dye image can be improved by readily adjusting the size of the heat source that is used to supply the thermal energy, the contact place of the dye donor sheet and the dye receptor sheet, and the thermal energy.

Typically, the applied thermal energy is controlled to give light and dark gradation of the image for the efficient transfer of the dye from the donor sheet to ensure continuous gradation of the image as in a photograph. Thus, by using in combination with a dye receptor sheet, the dye donor sheet of the present invention can be utilized in the print preparation of a photograph by printing, facsimile, or magnetic recording systems wherein various printers of thermal printing systems are used, or print preparation for a television picture, or cathode ray tube picture by operation of a computer, or a graphic pattern or fixed image for suitable means such as a video camera, and in the production of progressive patterns from an original by an electronic scanner that is used in photomechanical processes of printing.

The invention has been described with reference to various specific and preferred embodiments and will be further described by reference to the following detailed examples. It is understood, however, that there are many extensions, variations, and modifications on the basic theme of the present invention beyond that shown in the examples and detailed description, which are within the spirit and scope of the present invention.

EXAMPLES

The invention has been described with reference to various specific and preferred embodiments and will be further described by reference to the following detailed examples. It is understood, however, that there are many extensions, variations, and modifications on the basic theme of the present invention beyond that shown in the examples and detailed description, which are within the spirit and scope of the present invention.

Example 1

Preparation of
4-(4'-fluorophenylazo)-(N-ethyl-N-hydroxyethyl)aniline (Dye #1)

A solution of 6.21 g of sodium nitrite (0.0895 mole) in 10 mL of distilled water was slowly added to a stirred solution of 10 g of 4-fluoroaniline from Aldrich Chem. Co. (0.0895 mole) in 21.5 g of concentrated hydrochloric acid and 75 mL of distilled water at 0°–5° C. The reaction mixture was then filtered by suction filtration. The filtrate was added dropwise to a stirred solution of 14.79 g of N-ethyl-N-phenylethanolamine from Aldrich Chem. Co. (0.0895 mole) in 30 mL of ethanol at 0°–5° C. The resultant orange precipitate was collected by suction filtration, washed with water, and then recrystallized from ethanol to give orange crystals; m.p. 101° C. $^1$H NMR (DMSO-d$_6$): δ1.15 (t, 3H); 3.50 (m, 4H); 3.60 (m, 2H); 4.83 (t, 1H); 6.82 (d, 2H); 7.35 (t, 2H); 7.78 (d, 2H); 7.82 (q, 2H).

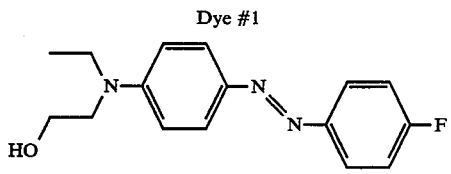

Dye #1

Example 2

Preparation of
4-(3'-fluorophenylazo)-(N-ethyl-N-hydroxyethyl)aniline (Dye #2)

A solution of 6.21 g of sodium nitrite (0.0895 mole) in 10 mL of distilled water was slowly added to a stirred solution of 10 g of 3-fluoroaniline Aldrich Chem. Co. (0.0895 mole) in 21.5 g of concentrated hydrochloric acid and 75 mL of distilled water at 0°–5° C. The reaction mixture was then filtered by suction filtration. The filtrate was added dropwise to a stirred solution of 14.79 g of N-ethyl-N-phenylethanolamine from Aldrich Chem. Co. (0.0895 mole) in 30 mL of ethanol at 0°–5° C. The resultant orange precipitate was collected by suction filtration, washed with water, and then recrystallized from ethanol to give orange crystals; m.p. 98° C. $^1$H NMR (DMSO-d$_6$): δ1.15 (t, 3H); 3.50 (m, 4H); 3.60 (m, 2H); 4.85 (t, 1H); 6.82 (d, 2H); 7.28 (t, 1H); 7.55 (m, 3H); 7.78 (d, 2H).

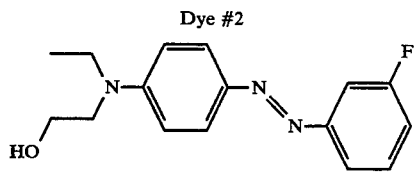

Dye #2

Example 3

Preparation of
4-(2'-fluorophenylazo)-(N-ethyl-N-hydroxyethyl)aniline (Dye #3)

A solution of 6.21 g of sodium nitrite (0.0895 mole) in 10 mL of distilled water was slowly added to a stirred solution of 10 g of 2-fluoroaniline from Aldrich Chem. Co. (0.0895 mole) in 21.5 g of concentrated hydrochloric acid and 75 mL of distilled water at 0°–5° C. The reaction mixture was then filtered by suction filtration. The filtrate was added dropwise to a stirred solution of 14.79 g of N-ethyl-N-phenylethanolamine from Aldrich Chem. Co. (0.0895 mole) in 30 mL of ethanol at 0°–5° C. The resultant orange precipitate was collected by suction filtration, washed with water, and then recrystallized from ethanol to give orange crystals; m.p. 82° C. $^1$H NMR (DMSO-d$_6$): δ1.15 (t, 3H); 3.50 (m, 4H); 3.60 (m, 2H); 4.83 (t, 1H); 6.85 (d, 2H); 7.29 (t, 1H); 7.42 (m, 2H); 7.68 (t, 1H); 7.79 (d, 2H).

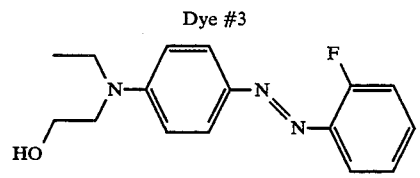

Dye #3

Example 4

Preparation of
4-(4'-fluorophenylazo)-(N,N-bis(2-hydroxyethyl)aniline (Dye #4)

A solution of 12.42 g of sodium nitrite (0.180 mole) in 20 mL of distilled water was slowly added to a stirred solution of 20 g of 4-fluoroaniline Aldrich Chem. Co. (0.180 mole) in 43 g of concentrated hydrochloric acid and 150 mL of distilled water at 0°–5° C. The reaction mixture was then filtered by suction filtration. The filtrate was added dropwise to a stirred solution of 32.58 g of N,N-bis-(2-hydroxyethyl)aniline from Aldrich Chem. Co. (0.180 mole) in 50 mL of ethanol at 5° C. The reaction mixture was then added to 1000 mL, of distilled water and the resultant yellow precipitate collected by suction filtration, washed with water, and then recrystallized from ethanol to give yellow crystals; m.p. 105° C. $^1$H NMR (DMSO-d$_6$): δ3.60 (m, 8H); 4.85 (t, 1H); 6.85 (d, 2H); 7.35 (t, 2H); 7.75 (d, 2H); 7.82 (m, 2H).

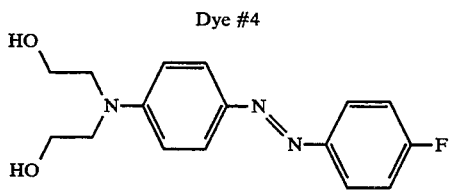

Dye #4

Example 5

Preparation of
4-(3'-fluorophenylazo)-(N-ethyl-N-methacryloylethylamideoxyethyl)aniline (Dye #5)

A solution of 3.78 g of isocyanato-ethyl methacrylate from Polysciences, Inc. (0.0244 mole) in 50 mL of dry dichloromethane was slowly added dropwise to a stirred solution of 7.0 g of Dye #2, 4-(3'-fluorophenylazo)-(N-ethyl-N-hydroxyethyl)aniline (0.0244 mole), and a few drops of dibutyl tin dilaurate from Aldrich Chem. Co. in 100 mL dry dichloromethane at room temperature. After the addition was completed, the reaction mixture was allowed to stand overnight with stirring and then refluxed for 2 hours. Dichloromethane was evaporated under reduced pressure to leave an orange viscous liquid purified by column chromatography on silica gel using dichloromethane/tetrahydrofuran (9/1) as an eluent. The collected orange viscous liquid crystallized in vacuo; m.p. 58° C. ¹H NMR (DMSO-d₆): δ1.15 (t, 3H); 1.87 (s, 3H); 3.28 (m, 2H); 3.50 (m, 2H); 3.62 (m, 2H); 4.08 (t, 2H); 4.18 (t, 2H); 5.70, 6.05 (s, 2H); 6.87 (d, 2H); 7.28 (t, 1H); 7.40 (t, 1H); 7.55 (m, 3H); 7.78 (d, 2H).

Dye #5

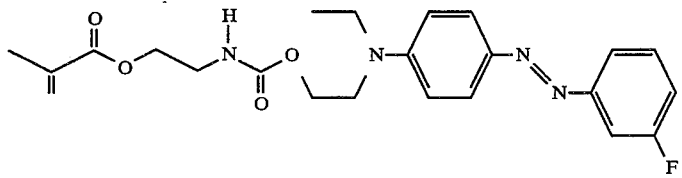

Example 6

Preparation of 4-(2'-trifluoromethylphenylazo)-(N,N-bis(2-hydroxyethyl)aniline (Dye #6)

A solution of 6.21 g of sodium nitrite (0.0895 mole) in 10 mL of distilled water was added dropwise to a stirred solution of 14.42 g 2-aminobenzotrifluoride from Aldrich Chem. Co. (0.0895 mole) in 21.50 g of concentrated hydrochloric acid and 75 mL of distilled water at 0°–5° C. The reaction mixture was then added dropwise to a solution of 14.42 g of N,N-bis(2)-hydroxyethyl)aniline from Aldrich Chem. Co. (0.0895 mole) in 30 mL of ethanol at 10°–15° C. with stirring. The mixture was allowed to stir for one hour after which 500 mL of distilled water was added. The dark brown precipitate was isolated and washed several times with water. The product was purified by column chromatography using silica gel and tetrahydrofuran/dichloromethane as eluent (8/2). The collected viscous orange liquid crystallized in vacuo; m.p. 86° C. ¹H NMR (DMSO-d₆): δ3.65 (m, 8H); 4.90 (t, 2H); 6.92 (d, 2H); 7.60 (t, 1H); 7.80 (d, 5H).

Dye #6

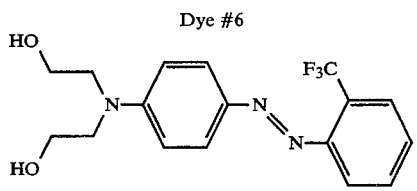

Example 7

Preparation of 4-(3'-trifluoromethylphenylazo)-(N,N-bis(2-hydroxyethyl)aniline (Dye #7)

A solution of 6.21 g of sodium nitrite (0.0895 mole) in 10 mL of distilled water was added dropwise to a stirred solution of 14.42 g of 3-aminobenzotrifluoride from Aldrich Chem. Co. (0.0895 mole) in 21.50 g concentrated hydrochloric acid and 150 mL of distilled water at 0°–5° C. The reaction mixture was then added dropwise to a solution of 14.42 g of N,N-bis(2-hydroxyethyl)aniline from Aldrich Chem. Co. (0.0895 mole) in 30 mL of ethanol at 10°–15° C. with stirring. The mixture was allowed to stir for one hour alter which 500 mL of distilled water was added. The dark brown precipitate was isolated and washed several times with water. The product was purified by column chromatography using silica gel and tetrahydrofuran/dichloromethane as eluent (8/2). The collected viscous orange liquid crystallized in vacuo; m.p. 89° C. ¹H NMR (DMSO-d₆): δ3.60 (m, 8H); 4.85 (t, 2H); 6.88 (d, 2H); 7.78 (m, 4H); 8.02 (m, 2H).

Dye #7

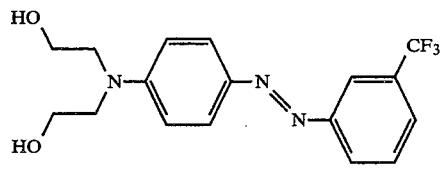

Example 8

Preparation of 4-(4'-trifluoromethylphenylazo)-(N,N-bis(2-hydroxyethyl)aniline (Dye #8)

A solution of 6.21 g of sodium nitrite (0.0895 mole) in 10 mL distilled water was added dropwise to a stirred solution of 14.42 g 4-aminobenzotrifluoride from Aldrich Chem. Co. (0.0895 mole) in 21.50 g concentrated hydrochloric acid and 75 mL of distilled water at 0°–5° C. The reaction mixture was then added dropwise to a solution of 14.42 g of N,N-bis(2-hydroxyethyl)aniline from Aldrich Chem. Co. (0.0895 mole) in 30 mL of ethanol at 10°–15° C. with stirring. The mixture was allowed to stir for one hour after which 500 mL of distilled water was added. The precipitate was collected and recrystallized from methanol/water (1/2) to give orange crystals; m.p. 139° C. ¹H NMR (DMSO-d₆): δ3.60 (m, 8H); 4.88 (br s, 2H); 6.88 (d, 2H); 7.81 (d, 2H); 7.87 (d, 2H); 7.93 (d, 2H).

Dye #8

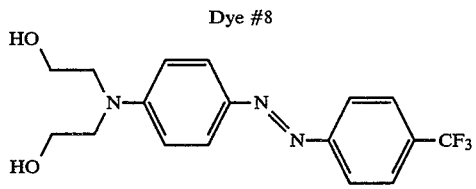

Example 9

Preparation of Poly(4-(3'-fluorophenylazo)-(N-ethyl-N-methacryloylethylamideoxyethyl)aniline) (Dye #9)

After degassing with nitrogen at room temperature for 45 minutes, 0.05 g of 2,2'-azobis(isobutyronitrile) was added to a solution of 6.20 g of 4-(3'-fluorophenylazo)-(N-ethyl-N-methacryloylethylamideoxyethyl)aniline (0.0146 mole) in 90 mL of anhydrous 1-methyl-2-pyrrolidinone. The solution was degassed with nitrogen for an additional 10 minutes and then heated at 65°–70° C. with stirring under a nitrogen atmosphere for 3 days. The red reaction mixture was cooled and added dropwise to 500 mL of distilled water with vigorous stirring. The resultant orange precipitate was collected, washed well with ethanol/water (1/1), and dried in vacuo for 2 days. $^1$H NMR (DMSO-d$_6$): δ0.80 (br s, 3H); 1.15 (br s, 3H); 3.28 (br s, 2H); 3.50 (br s, 2H); 3.62 (br s, 2H); 4.08 (br s, 2H); 4.18 (br s, 2H); 6.75 (br s, 2H); 7.20 (br s, 2H); 7.45 (br s, 2H); 7.55 (br s, 1H); 7.78 (br s, 2H). Molecular weight (mw)=44,000 (weight average).

Oligomers with lower molecular weights were prepared by reducing the time heated at 65°-70° C. with stirring under a nitrogen atmosphere from 3 hours; (Dye 9A, mw=8,000) to 2 hours (Dye 9B, mw=5,000) to 1 hour (Dye 9C, mw=2,000).

Dye #9

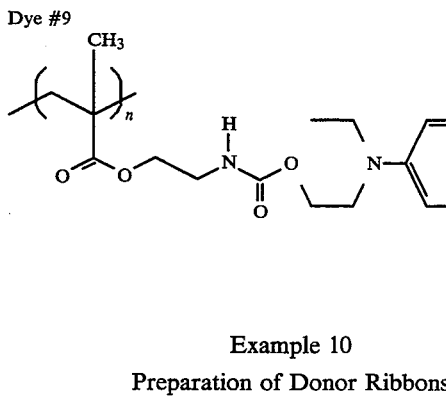

Example 10

Preparation of Donor Ribbons

Each of the following formulations were coated with a number 8 wire-wound coating rod (0.72 mil wet thickness) onto 5.7 micron Teijin F24G polyester thermal film (available from Teijin Limited, Tokyo, Japan) and dried in a current of an industrial heat gun.

| Formulation #1 | |
|---|---|
| Test Dye (3% in Tetrahydrofuran) | 2.5 g |
| Geon ™ 178 (Polyvinylchloride resin; B. F. Goodrich) (5% in Tetrahydrofuran) | 1.0 g |
| Viten ™ PE200 (Polyester resin; Goodyear) (5% in Tetrahydrofuran) | 0.05 g |
| Uvinul ™ N539 (UV stabilizer; BASF) (10% in Methyl ethyl ketone) | 0.20 g |
| RD1203 (60/40 blend of Polyoctadecyl acrylate and Polyacrylic acid 3M) (7% in Methyl ethyl ketone) | 0.10 g |
| Formulation #2 | |
| Test Dye (3% in Tetrahydrofuran) | 2.5 g |
| Geon ™ 178 (Polyvinylchloride resin; B. F. Goodrich) (5% in Tetrahydrofuran) | 1.0 g |
| Vitel ™ PE200 (Polyester resin; Goodyear) (5% in Tetrahydrofuran) | 0.05 g |
| Tinuvin ™ 292 (UV stabilizer; Ciba Geigy) (5% in Methyl ethyl ketone) | 0.20 g |
| RD1203 (60/40 blend of Polyoctadecyl acrylate and Polyacrylic acid, 3M) (7% in Methyl ethyl ketone) | 0.15 g |
| Formulation #3 | |
| Test Dye (3% in Tetrahydrofuran) | 1.0 g |
| Anthroquinone Dye (Compound 3 in U.S. Pat. No. 4,857,503, 3% in Tetrahydrofuran) | 0.5 g |

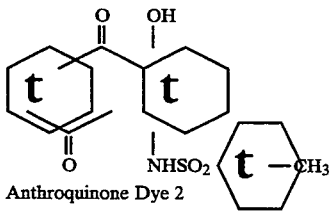
Anthroquinone Dye 2

| | 0.5 g |
|---|---|
| (Synthesized analogously to dyes described in U.S. Pat. No. 4,857,503, 3% in Tetrahydrofuran) | |
| Geon ™ 178 (Polyvinylchloride resin; B. F. Goodrich) (5% in Tetrahydrofuran) | 1.0 g |
| Vitel ™ PE200 (Polyester resin; Goodyear) (5% in Tetrahydrofuran) | 0.05 g |
| Uvinul ™ N539 (UV stabilizer; BASF) (10% in Methyl ethyl ketone) | 0.20 g |
| RD1203 (60/40 blend of Polyoctadecyl acrylate and Polyacrylic acid, 3M) (7% in Methyl ethyl ketone) | 0.10 g |

Table 1 summarizes the donor sheets that were prepared to evaluate the dyes for shelf-life stability, density transfer and light stability.

TABLE 1

| Donor Sheet | Dye | Formulation |
|---|---|---|
| A | #6 | #1 |
| B | #7 | #1 |
| C | #8 | #1 |
| D | 1:1:1 Blend of #6/#7/#8 | #1 |
| E | #5 | #1 |
| F | #9A | #2 |
| G | #9B | #2 |
| H | #9C | #2 |
| I | #6 | #3 |
| J | #7 | #3 |
| K | #8 | #3 |
| L | 1:1:1 Blend of #6/#7/#8 | #3 |
| M | #5 | #3 |

Shelf-life stability of the donor ribbon was evaluated qualitatively by observing opacity in the sheet upon standing at room temperature under a glass. Unstable donor sheets would typically become cloudy or powder within hours. Stable donor sheets remained clear for at least 6 months. Stability results are summarized in Table 2. These results show that dyes 6, 7, and 8 do not show the stability of the blend of the three dyes, and that dyes 5 and 9 show superior stability.

TABLE 2

| Donor sheet A | Unstable |
|---|---|
| Donor sheet B | Unstable |
| Donor sheet C | Unstable |
| Donor sheet D | Stable |
| Donor sheet E | Stable |
| Donor sheet F | Stable |
| Donor sheet G | Stable |
| Donor sheet H | Stable |
| Donor sheet L | Stable |
| Donor sheet M | Stable |

Donor ribbons, i.e., donor sheets, were evaluated in a thermal printer equipped with a Kyocera raised glaze thin film thermal print head (Kyocera Corp., Kyoto, Japan) with 8 dots/mm and 0.3 watts/dot. In normal imaging, the electrical energy was varied from 0 to 16 joule/cm$^2$, which corresponds to head voltages from 0 to 14 volts with a 23 msec burn time. Other heat sources may be employed such as an infrared laser or laser diode, infrared flash, heated pens, etc. The images were transferred to a receptor sheet. The receptor sheet used to evaluate the donor ribbons was purchased from DuPont under the tradename IV-CAST. Examples of alternative receptor sheets useful for this application are described in U.S. Pat. No. 5,232,892.

Contrast or ability to reproduce a grey scale from low to high densities of color was evaluated by thermally transferring the dye at various thermal print head voltages to achieve ten levels of density between the lowest and highest density capability of the donor sheet. A high quality donor ribbon is capable of producing different degrees of dry transfer from the lowest to highest density levels without mass transfer of the dye. FIGS. 1, 2 and 3 show plots of the density levels achieved by the representative dye donor sheets as the voltage is varied. Densities were measured on a Gretag SPM 100 Spectrophotometer. These results show that the dyes of the present invention exhibit high densities that meet or exceed the target density of 1 that is typically standard for applications of such dyes.

The light stability of tile resultant images was assessed by exposure at room temperature in a light enclosure equipped with a Luminant D50 lamp at a distance of 36 inches. The results summarized in Table 3 are expressed as Delta E, the change in L*, a*, b* color coordinates.

TABLE 3

| Donor Sheet | Delta E | |
|---|---|---|
| | 48 hrs. | 168 hrs. |
| I | 5.40 | 10.33 |
| J | 3.43 | 7.06 |
| K | 4.11 | 11.12 |
| L | 1.97 | 3.32 |
| M | 1.02 | 3.59 |
| F | 0.60 | 2.71 |
| G | 1.26 | 2.66 |
| H | 0.67 | 2.75 |

These results show that donor sheets L, M, F, G, and H display superior results with respect to a shift in color in an accelerated light stability test. Thus, to the typical observer no change in the yellow-orange colors would be perceived.

The foregoing detailed description and examples have been given for clarity of understanding only. No unnecessary limitations are to be understood therefrom. The invention is not limited to the exact details shown and described, tier variations obvious to one skilled in the art will be included within the invention defined by the claims.

What is claimed is:

1. A thermal transfer donor sheet comprising a flexible substrate having coated thereon a dye donor layer containing a dye of the formula (Formula I):

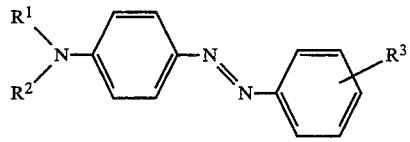

wherein:
(a) $R^1$ = a ($C_{1-20}$)alkyl or hydroxy($C_{1-20}$)alkyl group;
(b) $R^2$ = a hydroxy($C_{1-20}$)alkyl or ($C_{1-20}$)alkylene—OC(O)NH—($C_{1-20}$)alkylene—OC(O)—$R^4$ wherein $R^4$ is a ($C_{2-20}$)alkenyl group or a polymerized alkenyl group;
(c) $R^3$ = F or $CF_3$; and
(d) said dye is stable under ambient conditions for at least about 6 months.

2. The thermal transfer donor sheet of claim 1 wherein the dye donor layer further comprises a binder.

3. The thermal transfer donor sheet of claim 1 wherein:
(a) $R^1$ = a ($C_{2-8}$)alkyl or hydroxy($C_{2-8}$)alkyl group;
(b) $R^2$ = a hydroxy($C_{2-8}$)alkyl or ($C_{2-8}$)alkylene—OC(O)NH—($C_{2-8}$)alkylene—OC(O)—$R^4$ wherein $R^4$ is a ($C_{2-8}$)alkenyl group or a polymerized alkenyl group; and
(c) $R^3$ = F or $CF_3$.

4. The thermal transfer donor sheet of claim 3 wherein:
(a) $R^1$ = a ($C_{2-4}$)alkyl or hydroxy($C_{2-4}$)alkyl group;
(b) $R^2$ = a hydroxy($C_{2-4}$)alkyl or ($C_{2-4}$)alkylene—OC(O)NH—($C_{2-4}$)alkylene—OC(O)—$R^4$ wherein $R^4$ is —($CH_3$)C=$CH_2$ or a polymerized —($CH_3$)C=$CH_2$ group; and
(c) $R^3$ = F or $CF_3$.

5. The thermal transfer donor sheet of claim 4 wherein:
(a) $R^1$ = —$CH_2CH_3$ or —$CH_2CH_2OH$;
(b) $R^2$ = —$CH_2CH_2OC(O)NHCH_2CH_2OC(O)$—$R^4$ wherein $R^4$ is —($CH_3$)C=$CH_2$ or

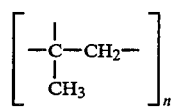

wherein n=2–100.

6. The thermal transfer donor sheet of claim 5 wherein $R^3$=F and n=3–50.

7. The thermal transfer donor sheet of claim 5 wherein the dye is a compound of the formula:

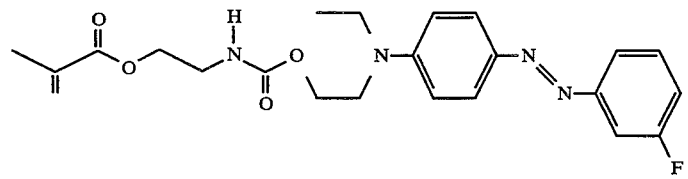

8. The thermal transfer donor sheet of claim 5 wherein the dye is a compound of the formula:

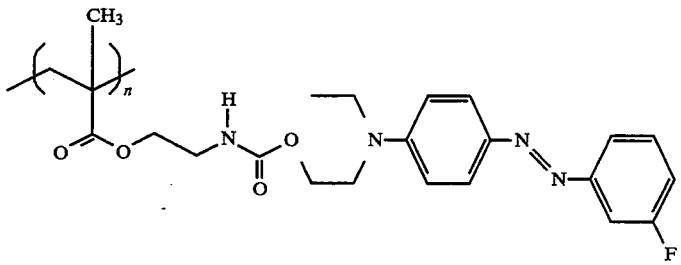

wherein n=3-10.

9. The thermal transfer donor sheet of claim 3 wherein the dye is a mixture of ortho, meta, and para isomers of the compound of Formula I wherein:
(a) $R^1$=—$CH_2CH_2OH$;
(b) $R^2$=—$CH_2CH_2OH$; and
(c) $R^3$=$CF_3$;
wherein said dye mixture is stable under ambient conditions for at least about 6 months.

10. A process for providing an image by a thermal transfer process comprising:
(a) providing a thermal transfer donor sheet and a thermal transfer receptor sheet in a facing relationship; and
(b) applying heat in an imagewise distributed manner to the donor sheet to cause material on the donor sheet to transfer to the receptor sheet;
wherein the donor sheet comprises a flexible substrate having coated thereon a dye donor layer containing a dye of the formula (Formula I):

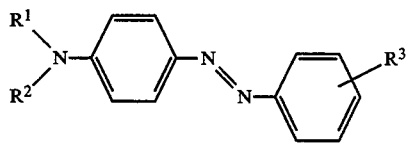

wherein:
(i) $R^1$=a ($C_{1-20}$)alkyl or hydroxy($C_{1-20}$)alkyl group;
(ii) $R^2$=a hydroxy($C_{1-20}$)alkyl or ($C_{1-20}$)alkylene—OC(O)NH—($C_{1-20}$)alkylene—OC(O)—$R^4$ wherein $R^4$ is a ($C_{2-20}$)alkenyl group or a polymerized alkenyl group;

(iii) $R^3$=F or $CF_3$; and
(iv) said dye is stable under ambient conditions for at least about 6 months.

11. The process of claim 10 wherein:
(a) $R^1$=a ($C_{2-8}$)alkyl or hydroxy($C_{2-8}$)alkyl group;
(b) $R^2$=a hydroxy($C_{2-8}$)alkyl or ($C_{2-8}$)alkylene—OC(O)NH—($C_{2-8}$)alkylene—OC(O)—$R^4$ wherein $R^4$ is a ($C_{2-8}$)alkenyl group or a polymerized alkenyl group; and
(c) $R^3$=F or $CF_3$.

12. The thermal transfer donor sheet of claim 11 wherein:
(a) $R^1$=a ($C_{2-4}$)alkyl or hydroxy($C_{2-4}$)alkyl group;
(b) $R^2$=a hydroxy($C_{2-4}$)alkyl or ($C_{2-4}$)alkylene—OC(O)NH—($C_{2-4}$)alkylene—OC(O)—$R^4$ wherein $R^4$ is —$(CH_3)C$=$CH_2$ or a polymerized —$(CH_3)C$=$CH_2$ group; an
(c) $R^3$=F or $CF_3$.

13. The thermal transfer donor sheet of claim 12 wherein:
(a) $R^1$=—$CH_2CH_3$ or —$CH_2CH_2OH$;
(b) $R^2$=—$CH_2CH_2OC(O)NHCH_2CH_2OC(O)$—$R^4$ wherein $R^4$ is —$(CH_3)C$=$CH_2$ or

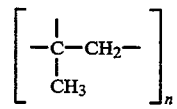

wherein n=2-100.

14. The process of claim 13 wherein $R^3$ is F and n=3-50.

15. The process of claim 13 wherein the dye is a compound of the formula:

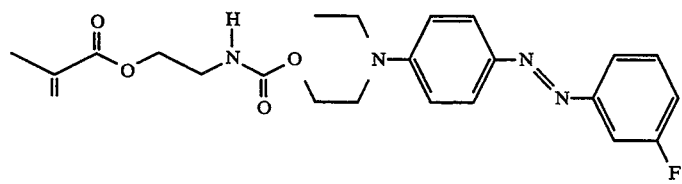

16. The thermal transfer donor sheet of claim 13 wherein the dye is a compound of the formula:

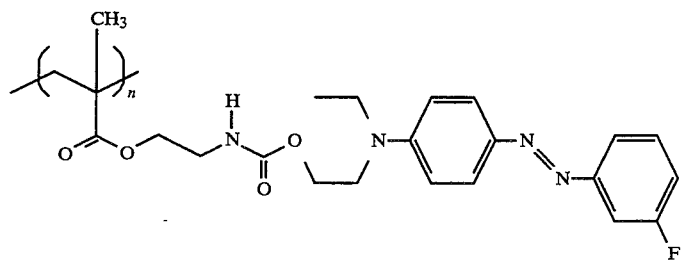
wherein n=3–10.
17. The process of claim 12 wherein the dye is a mixture of ortho, meta, and para isomers of the compound of Formula I wherein:
(a) $R^1$=—CH$_2$CH$_2$OH;
(b) $R^2$=—CH$_2$CH$_2$OH; and
(c) $R^3$=CF$_3$;
wherein said dye mixture is stable under ambient conditions for at least about 6 months.
* * * * *

UNITED STATES PATENT AND TRADEMARK OFFICE
CERTIFICATE OF CORRECTION

PATENT NO.: 5,350,731

DATED: September 27, 1994

INVENTOR(S): Williams et al.

It is certified that error appears in the above-identified patent and that said Letters Patent is hereby corrected as shown below:

Column 4, line 56, delete "recta" and insert --meta--.

Column 4, line 58, delete "recta" and insert --meta--.

Column 5, line 46, delete "tier" and insert --for--.

Column 9, line 37, delete "Aldrich" and insert --from Aldrich--.

Column 13, line 42, delete "Viten™" and insert --Vitel™--.

Column 15, line 54, delete "tier" and insert --for--.

Signed and Sealed this

Twenty-eighth Day of May, 1996

BRUCE LEHMAN

Commissioner of Patents and Trademarks

UNITED STATES PATENT AND TRADEMARK OFFICE
CERTIFICATE OF CORRECTION

PATENT NO. : 5,350,731
DATED : September 27, 1994
INVENTOR(S) : Williams et al.

It is certified that error appears in the above-indentified patent and that said Letters Patent is hereby corrected as shown below:

Column 13, lines 61-68, delete:

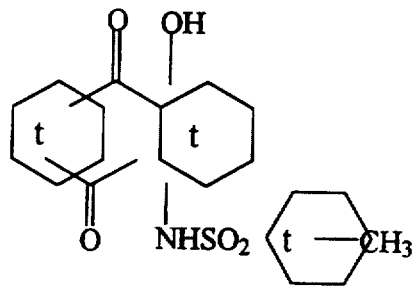

Anthroquinone Dye 2

UNITED STATES PATENT AND TRADEMARK OFFICE
CERTIFICATE OF CORRECTION

PATENT NO. : 5,350,731

DATED : September 27, 1994

INVENTOR(S) : Williams et al

Page 3 of 3

It is certified that error appears in the above-indentified patent and that said Letters Patent is hereby corrected as shown below:

and insert:

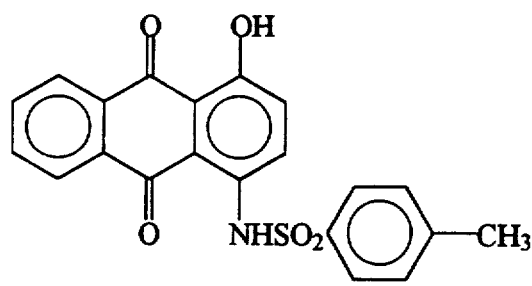

Anthroquinone Dye 2